Patented Dec. 12, 1944

2,365,135

UNITED STATES PATENT OFFICE 2,365,135

MANUFACTURE OF TITANIUM PIGMENTS

Robert William Ancrum, Stockton-on-Tees, England, assignor to Titan Company Incorporated, New York, N. Y., a corporation of Delaware No Drawing. Application April 15, 1942, Serial No. 439,077. In Great Britain July 3, 1941

7 Claims. (Cl. 106—300)

The present invention relates to rutile titanium dioxide pigments, and has particular reference to methods for converting anatase titanium dioxide into rutile titanium dioxide.

Titanium dioxide occurs in three crystalline modifications, namely, anatase, brookite and rutile, having refractive indices of 2.52, 2.64 and 2.71 respectively. Commercial titanium dioxide pigments are usually characterized by the anatase crystalline structure and such pigments are usually extremely fine and chalk with extreme rapidity when formulated in exterior coating compositions.

Various attempts have been made to overcome these undesirable properties of anatase titanium dioxide, some of which have been directed towards the production of pigmentary rutile dioxide by direct conversion from anatase at elevated temperatures. Due to conditions prevailing during the conversion, it is a matter of considerable difficulty to develop all the pigmentary properties to such a degree that the product has a wide commercial application. For example, during the conversion process considerable sintering may occur and the product may be hard and discolored and, under these conditions, while the chalk resistance may be satisfactory, the hardness, brightness and tone of the pigment are such as to restrict its commercial application.

It is a primary object of the present invention to provide means for the preparation of rutile titanium dioxide pigments free from the deficiencies of prior art pigments. Another object of the invention is to provide means whereby anatase titanium dioxide may be converted to pigmentary rutile titanium dioxide possessing satisfactory pigment properties for use in both interior and exterior coating compositions. A third object of the invention is the preparation of white titanium dioxide pigment, the titanium dioxide of which is substantially rutile, and consisting of uniform, relatively coarse particles and exhibiting markedly improved resistance to chalking when incorporated in exterior coating compositions. These and other objects of the invention will become apparent from the following description thereof.

When hydrous titanium oxide, such as is obtained in commercial processes from sulfuric acid solutions of ilmenite, is calcined to produce pigmentary titanium dioxide, the crystalline structure of the titanium dioxide and the chalk resistance of the pigment are related to the conditions of calcination. Thus, in normal practice calcination is carried out at temperatures about 900° C. for several hours to produce an excellent white, bright, titanium dioxide pigment of the anatase modification but which contains very fine particles and tends to excessive chalking. Under more intense heat treatment, as by prolonging the calcination time or raising the temperature, or both, the anatase is converted to rutile, the chalk resistance is improved but, at the same time, the brightness drops, and the pigment tends to become excessively hard and gritty, and discolored.

It has been found that if antimony oxide be admixed with the hydrous titanium oxide the intensity of the calcination may be increased, thereby enhancing the resistance to chalking, without causing excessive hardness of the pigment. For instance, when so employing antimony oxide, it is possible to calcine for about three hours at about 1000° C. to produce a pigment having improved chalk resistance, while retaining a soft, smooth texture. More intense calcination of anatase titanium dioxide admixed with antimony oxide to convert the anatase substantially completely into rutile produces a product poor in brightness which has only a very restricted commercial usefulness. By means of the present invention it is possible to convert anatase titanium dioxide admixed with antimony oxide substantially completely to rutile titanium dioxide, while avoiding any consequential loss in brightness. (The term "anatase titanium dioxide" as employed in the specification and appended claims is meant to include hydrous titanium oxide which upon calcination yields anatase titanium dioxide as well as anhydrous anatase titanium dioxide itself.)

In its broadest aspect the invention contemplates subjecting anatase titanium dioxide admixed with antimony oxide to a calcination treatment of sufficient intensity substantially completely to convert the anatase to rutile and then subjecting the calcination product to a protracted, or delayed, cooling treatment. Under present practice, the time required for the temperature of the calcination product upon emerging from the calciner to drop to about 300° C. is less than 15 minutes. If according to the invention, the rate of cooling of the calcination be delayed, even up to as long as five hours, the resulting pigment will not have suffered any consequential loss in brightness.

Any suitable means for prolonging the rate of cooling may be employed within the scope of the invention. For instance, the calcination product may be discharged from the calciner into a closed vessel so insulated as to permit a relatively slow dissipation of heat from the calcination product. Alternatively, the calcination product may be caused to pass at a predetermined desired rate of travel through a rotating cylinder, slightly tilted from the horizontal and provided with means, such as heating coils, for establishing within the cylinder progressively diminishing temperature zones.

The improved results of the invention begin to be evident when the time required for the temperature of the calcination product to drop to 300° C. is prolonged beyond normal practice; that is to say beyond about 15 minutes. Generally speaking, no advantages result from prolonging the period of cooling beyond about 5 hours and for all practical purposes a cooling time of about one hour to about three will be satisfactory.

It should be borne in mind when practicing the invention that time and temperature of calcination are, to a considerable degree, reciprocal and that, therefore, the calcination time and calcination temperature should be so chosen with respect to each other as to produce an intensity of calcination sufficient to convert the anatase titanium dioxide admixed with antimony oxide substantially completely to rutile titanium dioxide. The conversion of the anatase to rutile may be followed by means of X-ray examination and the calcination should be continued until such examination shows the presence of substantial amounts of rutile titanium dioxide. For practical embodiments of the invention the temperature of calcination should generally be within the range of about 950° C. to about 1100° C. and the time of calcination within the range of about one hour to about four hours. A generally satisfactory calcination is obtained at about 1050° C. for about three hours. It should be understood, however, that the invention is not limited to the use of any particular calcination temperature or calcination time, since calcination conditions required in order to obtain substantially complete conversion to rutile with consequent substantial increase in particle size (gram growth) depend, inter alia, upon the physical condition of the hydrous titanium oxide to be calcined, which physical condition may vary considerably with variations in the precipitation technique employed in its production.

The antimony oxide which, according to the invention, is to be mixed with the anatase titanium dioxide may be in the form of the trioxide, the pentaoxide, or a compound of antimony, for instance, antimony oxychloride, $SbOCl_3$, antimony sulfate, $Sb_2(SO_4)_3$, antimony pentasulfide, $Sb_2S_5$, which under the conditions of calcination yields antimony oxide. In the claims appended hereto the antimony compounds adapted for use in the practice of the invention are generically referred to as "reactive antimony compounds." The proportion of antimony compound to be used is not critical but the improved effects thereof will be attained when using upwards of about 1.0 percent. Generally speaking, the amount of antimony compound should be between about 5 percent and about 40 percent, calculated as antimony oxide, $Sb_2O_3$, based on the titanium dioxide content of the anatase titanium dioxide with a preferred range of about 10 percent to about 30 percent. The whole of the antimony compound need not be admixed with the anatase titanium dioxide immediately prior to calcination but some of it may be added at an earlier stage in the preparation of the anatase, for example, during the digestion of the ore or during any stage prior to the precipitation of hydrous titanium oxide.

According to a further feature of the invention, a titanium dioxide pigment produced by subjecting anatase hydrous titanium oxide admixed with antimony compound to a calcination of sufficient intensity to obtain substantially complete conversion of anatase to rutile, followed by a cooling in the customary fashion, (i. e. cooling to 300° C. in a period of less than 15 minutes) is reheated to a temperature of about 1000° C. and is then cooled from 1000° C. to 300° C. in a period from 15 minutes to 5 hours.

Conditioning agents, that is, agents normally used during calcination, such as potassium salts and phosphates, to allow a satisfactory control of the calcination process, may be used in the present process but the proportion should not be so great as to inhibit to any considerable extent the conversion of the titanium dioxide to rutile form.

In order that the invention may be more easily understood the following non-limitative example is given:

*Example*

Hydrous titanium oxide, precipitated from a sulfuric acid solution of titanium was mixed with an amount of commercial antimony trioxide equal to 10 percent by weight of the titanium dioxide, $TiO_2$, content of the hydrous titanium oxide. 0.35% of potassium carbonate was added during the mixing process and the slurry was dried and calcined for 3 hours at 1,050° C. At the conclusion of calcination the product was allowed to cool slowly in a closed chamber to a temperature of 300° C. during a period of 2 hours. The resulting product which had a brightness of 96% compared with 98.5% for normal pigmentary anatase titanium dioxide, was a stable, chalk resistant rutile titanium dioxide pigment of soft, smooth texture.

Rutile pigments prepared in the manner of the present invention are characterized by extreme softness, in contrast with prior methods for the conversion of anatase to rutile which invariably give rise to hard products by reason of the sintering which takes place during the conversion. The products of the invention show a considerable increase in particle size and, in view of this, their softness is all the more surprising. They require the minimum of grinding to reduce the oil absorption values well below those obtained for commercial grades of anatase pigments. In addition, they show remarkable resistance to discoloration when formulated in coating compositions and in plastics. The dispersion in paint vehicles is not inferior to the best grades of commercial anatase pigments. These benefits are obtained in addition to greatly enhanced chalking and fading resistant characteristics.

The present invention may be employed with hydrous titanium oxide which has been precipitated upon or admixed with extender pigments such as calcium sulfate and barium sulfate and when so used composite titanium pigments, the titanium dioxide content of which is in the rutile modification, are obtained. Furthermore, pigmentary rutile titanium dioxide prepared according to the invention is excellently suited to the preparation of composite titanium pigments by mechanical mixing or blending with extender pigments.

I claim:

1. Method for the preparation of improved rutile titanium dioxide pigments which comprises calcining anatase titanium dioxide admixed with a compound selected from the group consisting of antimony oxides and antimony compounds which yield oxides under the conditions of calcination until by X-ray examination the anatase titanium dioxide is substantially completely converted to rutile titanium dioxide and then protracting the rate of cooling of the calcined pigment to 300° C. over a period from upwards of fifteen minutes to about five hours.

2. Method for the preparation of improved rutile titanium dioxide pigments which comprises heating at temperatures between about 950° C. and about 1100° C. anatase titanium dioxide admixed with between about 1 percent and 40 percent of a compound selected from the group consisting of antimony oxides and antimony compounds which yield oxides under the conditions of calcination, calculated as antimony oxide, $Sb_2O_3$, based on the titanium dioxide content of the anatase titanium dioxide, until by X-ray examination the said anatase titanium dioxide is substantially completely converted to rutile titanium dioxide and then protracting the rate of cooling of the heated pigment to 300° C. over a period from upwards of fifteen minutes to about five hours.

3. Method for the preparation of improved rutile titanium dioxide pigments which comprises heating at temperatures between about 950° C. and about 1100° C. anatase titanium dioxide admixed with a compound selected from the group consisting of antimony oxides and antimony compounds which yield oxides under the conditions of calcination in an amount between about 1 percent and 40 percent, calculated as antimony oxide, $Sb_2O_3$, based on the titanium dioxide content of the anatase titanium dioxide for between about one hour and about four hours until the anatase titanium dioxide is substantially completely converted to rutile titanium dioxide, and then protracting the rate of cooling of the heated pigment to 300° C. over a period from upwards of fifteen minutes to about five hours.

4. Method for the preparation of improved rutile titanium dioxide pigments which comprises heating at temperatures between about 950° and about 1100° C. anatase titanium dioxide admixed with antimony oxide in an amount about 1 percent and 40 percent, based on the titanium dioxide content of the anatase titanium dioxide for between about one hour and about four hours until the anatase titanium dioxide is substantially completely converted to rutile titanium dioxide, and then protracting the rate of cooling of the heated pigment to 300° C. over a period from upwards of fifteen minutes to about five hours.

5. Method for the preparation of improved rutile titanium dioxide pigments which comprises heating at about 1050° C. anatase hydrous titanium oxide admixed with between about 5 percent and 30 percent antimony oxide based on the titanium dioxide, $TiO_2$, content of said hydrous titanium oxide for about three hours until the anatase titanium dioxide is substantially completely converted to rutile titanium dioxide, and then protracting the rate of cooling of the heated pigment to a temperature of about 300° C. over a period of from about one hour to about three hours.

6. Method for the preparation of improved rutile titanium dioxide pigments which comprises heating up to a temperature between about 1000° C. and 1100° C. a previously calcined anatase titanium dioxide pigment admixed with between about 1 percent and about 40 percent of a compound selected from the group consisting of antimony oxides and antimony compounds which yield oxides under the conditions of calcination, calculated as antimony oxide, $Sb_2O_3$, based on the titanium dioxide, $TiO_2$ content of said anatase and maintaining the heated pigment within said temperature range until by X-ray examination the anatase titanium dioxide is substantially completely converted to rutile titanium dioxide, and then protracting the rate of cooling of the heated pigment to about 300° C. over a period of from about one hour to about five hours.

7. Method according to claim 1 wherein there is an extender pigment admixed with the anatase titanium dioxide.

ROBERT WILLIAM ANCRUM.